United States Patent [19]

Ness-Cohn

[11] Patent Number: 5,212,832
[45] Date of Patent: May 18, 1993

[54] METHOD AND APPARATUS FOR OPERATOR MESSAGING USING VOICE CHANNEL SIGNALLING

[75] Inventor: David J. Ness-Cohn, Lisle, Ill.

[73] Assignee: Motorola, Inc., Schaumburg, Ill.

[21] Appl. No.: 618,197

[22] Filed: Nov. 26, 1990

[51] Int. Cl.⁵ .............................................. H04B 7/26
[52] U.S. Cl. .................................... 455/54.1; 455/56.1
[58] Field of Search ................... 455/33.1, 33.4, 32.1, 455/34.1, 34.2, 38.1, 54.2, 56.1, 54.1, 53.1; 379/58, 59, 63

[56] References Cited

U.S. PATENT DOCUMENTS

| | | | |
|---|---|---|---|
| 4,701,944 | 10/1987 | Howard et al. | 379/63 |
| 4,716,407 | 12/1987 | Borras et al. | 340/825.04 |
| 4,723,264 | 2/1988 | Sasuta et al. | 379/58 |
| 4,939,746 | 7/1990 | Childress | 455/54.2 X |
| 5,063,588 | 11/1991 | Patsiokas et al. | 379/57 |

OTHER PUBLICATIONS

LTR 8000 Repeater System Manual, E. F. Johnson, Co.-discloses the operation of their Logic Trunked Radio (LTR) system as well as the feature specific to the 8000 model series of repeaters and mobiles. In particular, §3.4 discusses signalling methods and data message formatting used in the LTR systems, 1982.

*Primary Examiner*—Reinhard J. Eisenzopf
*Assistant Examiner*—Chi Pham
*Attorney, Agent, or Firm*—James A. Coffing; Joseph P. Krause; Steven G. Parmelee

[57] ABSTRACT

A method and apparatus for operator messaging within a radio communication system (200) using a resource controller (203), which allocates a plurality of communication resources among a plurality of communication units (213, 215), is disclosed. Each of these communication units may be used by an operator having an operator code (262) and associated with a message (264, 266). This operator code and message, along with identification codes (252) representing each of the plurality of communication resources, are stored in a database (201) within the resource controller (203). The method includes the transmitting of the identification (ID) associated with a transmitting communication unit, matching this ID with one of the stored identification codes (252) in the database (201), and using this code to retrieve the message (254, 256) associated with the operator of this communication unit. This message is then sent, via sub-audible signals on the allocated communication resource, to at least one receiving communication unit (213, 215), which then displays (374) this message to be read by the receiving operator.

15 Claims, 5 Drawing Sheets

METHOD AND APPARATUS FOR OPERATOR MESSAGING USING VOICE CHANNEL SIGNALLING

FIELD OF THE INVENTION

The invention relates generally to trunked radio communication systems, and includes, but is not limited to trunked radio communication systems which provide support for operator messaging using voice channel signalling.

BACKGROUND OF THE INVENTION

FIG. 2A shows a typical trunked radio communication system block diagram 200. Resource controller 203, for example Motorola Smartnet II model number 'T5184', is coupled to a database 201 and is used to allocate communication resources within the system. Resources, including those used for both communication and control, are shown in the form of repeaters 205, 207, 209 and 211. These repeaters, under the direction of the resource controller 203, transmit and receive radio frequency signals to and from communication units 213, 215, for example Motorola Saber portable model series H99QX and Maxtrac mobile model series D35MWA. One of these repeaters, for example repeater 205, may be a dedicated control resource; that is, repeater 205 may be solely used to transmit and receive a predetermined set of communication control signals. This predetermined set of signals are generally sent via a control channel 221 to communication units 213 and 215. In such a system the remaining repeaters 207, 209 and 211 are used as voice/data repeaters which define a set of communication resources, for example, voice channels 223.

The sending of sub-audible signal data to communication units within such a system is known. In today's systems, control data (i.e. data which serves to direct inbound and outbound communication between communication units) is sent via a control resource, or channel. This control data generally includes a fixed identification code (ID) for the requesting communication unit. This code may include fleet information, sub-fleet information, and other parameters directly associated with the communication unit. In one type of system this control data may be transmitted sub-audibly on the same channel as the ensuing voice transmission. In another type of system, this control data may be transmitted on a resource, or channel, separate from the voice channel assigned, and may be dedicated for this purpose.

Currently, the fixed ID cannot be effectively used by the operators of receiving communication units to quickly identify the operator of a transmitting communication unit. This ID is generally not useful to an operator since it has no meaningful relationship to the transmitting operator. Even if a communication unit, or radio, is permanently assigned to an operator, the operator's name is not typically related in any way to the fixed ID of that radio. Worse yet is the case where an operator obtains a different radio daily.

In addition to the aforementioned dilemma, there is another problem with the current systems. The transmission of a communication unit's fixed ID to a receiving, or target, radio is used primarily to direct the other radios in the same fleet, or group, to tune in to the correct voice channel frequency for further communications. Once in this receiving mode, however, a communication unit is unable to monitor control data without potentially missing voice data.

As in any real time system, execution speed and timing are critical elements to the successful operation of that system. Today's trunked radio communication systems are no exception to this general rule. Access time to a voice call, though, is directly related to the amount of congestion currently existing on the control channel granting access to that call. Required information, including for example fleet and sub-fleet information, defines the lower boundaries for this critical access time. Obviously, sending additional information, for example the name of the operator transmitting a particular voice call, on a control channel, or resource, presents the problem of lengthening this critical access time, adding to an already over-burdened control resource.

Accordingly, there exists a dire need for a trunked radio communication system having the capability of sending operator-specific information to all receiving communication units for a particular call. Consideration must be made for minimizing increased access times, flexibility of the information to be sent, and efficiency with respect to a new radio joining an established call and still getting the information.

SUMMARY OF THE INVENTION

The present invention encompasses a method of operator messaging within a radio communication system having a resource controller which allocates, via a control resource, a plurality of communication resources among a plurality of communication units. Each of these communication units may be used by an operator having an operator code and associated with a message. This operator code and message, along with identification codes representing each of the plurality of communication resources, are stored in a database within the resource controller. The method includes the transmitting, from one of the communication units, of an identification (ID) associated with that communication unit, and the resource controller granting that communication unit access to one of the communication resources. The resource controller then matches the transmitted ID with one of the stored identification codes in the database, and uses this code to retrieve, from the database, the message associated with the operator of the transmitting communication unit. Then the resource controller sends this message, via subaudible signals on the granted communication resource, to at least one receiving communication unit, which communication unit then displays this message to be read by the receiving operator.

DETAILED DESCRIPTION OF A PREFERRED EMBODIMENT

Figure 1:
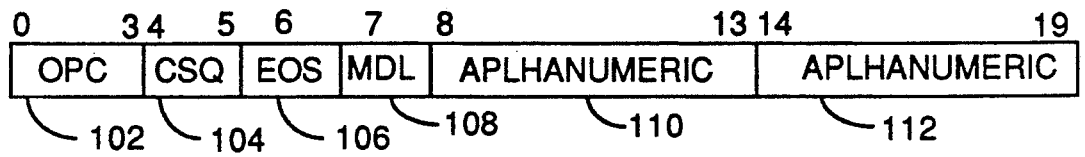
FIG. 1 is a block diagram showing the contents of a 20-bit signalling word, in accordance with the present invention.

FIG. 1 shows a 20-bit signalling word representing the information sent to a receiving communication unit on a system which embodies the present invention. Referring to word 100, bits 0-3 contain opcode 102 which denotes a low speed (i.e., sub-audible) word command. Bits 4-5 contain a character sequence number 104 which is incremented for each character pair in a message. Bit 6 contains an End-of-String marker 106 which is set when a character pair completes the message. Bit 7 is a message delimiter 108 which is toggled (i.e., from '0' to '1', or from '1' to '0') whenever there is a new message beginning with the current alphanumeric pair. Bits 8-13 contain the first character 110 in the alphanumeric character pair. Bits 14-19 contain the second character 112 in the alphanumeric character pair. Each of these fields are 6 bits in order to uniquely identify 1 of 26 alpha and 10 numeric characters.

In order to encode and decode information which is transmitted and received, respectively, each communication unit on the system has a resident data processing unit (DPU) 219. Similarly, the resource controller 203 has a resident DPU 217 which also serves to encode and decode communication signals, and further has the capability of manipulating data which is pertinent to system operation. In addition, the DPU utilizes a signal interface 231 which allows it to receive signals from, and send signals to, the repeaters on the system.

In the preferred embodiment of the present invention DPU 217, using operating instructions stored in memory 229, matches the incoming identification code of the transmitting communication unit with the associated operator code and retrieves the appropriate operator message from the database 201. Interface 231 then sends this message sub-audibly over the communication resource which is carrying the voice transmission for that operator.

Figure 2A:
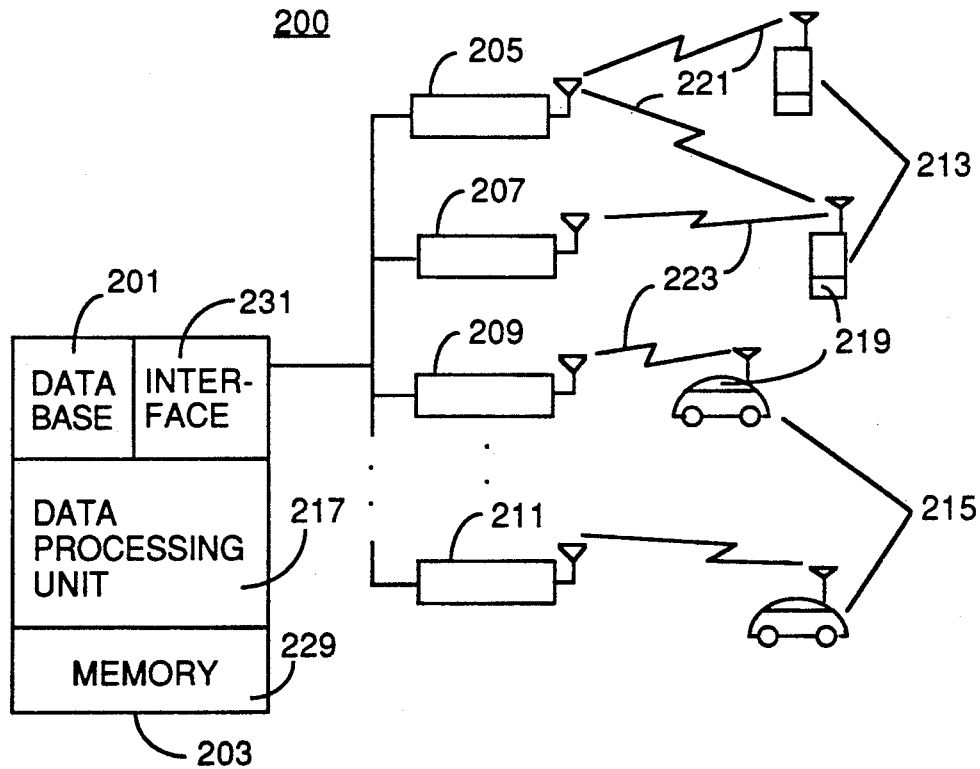
FIG. 2A is a simplified block diagram of a trunked radio communication system which is known in the art.
Figure 2B:
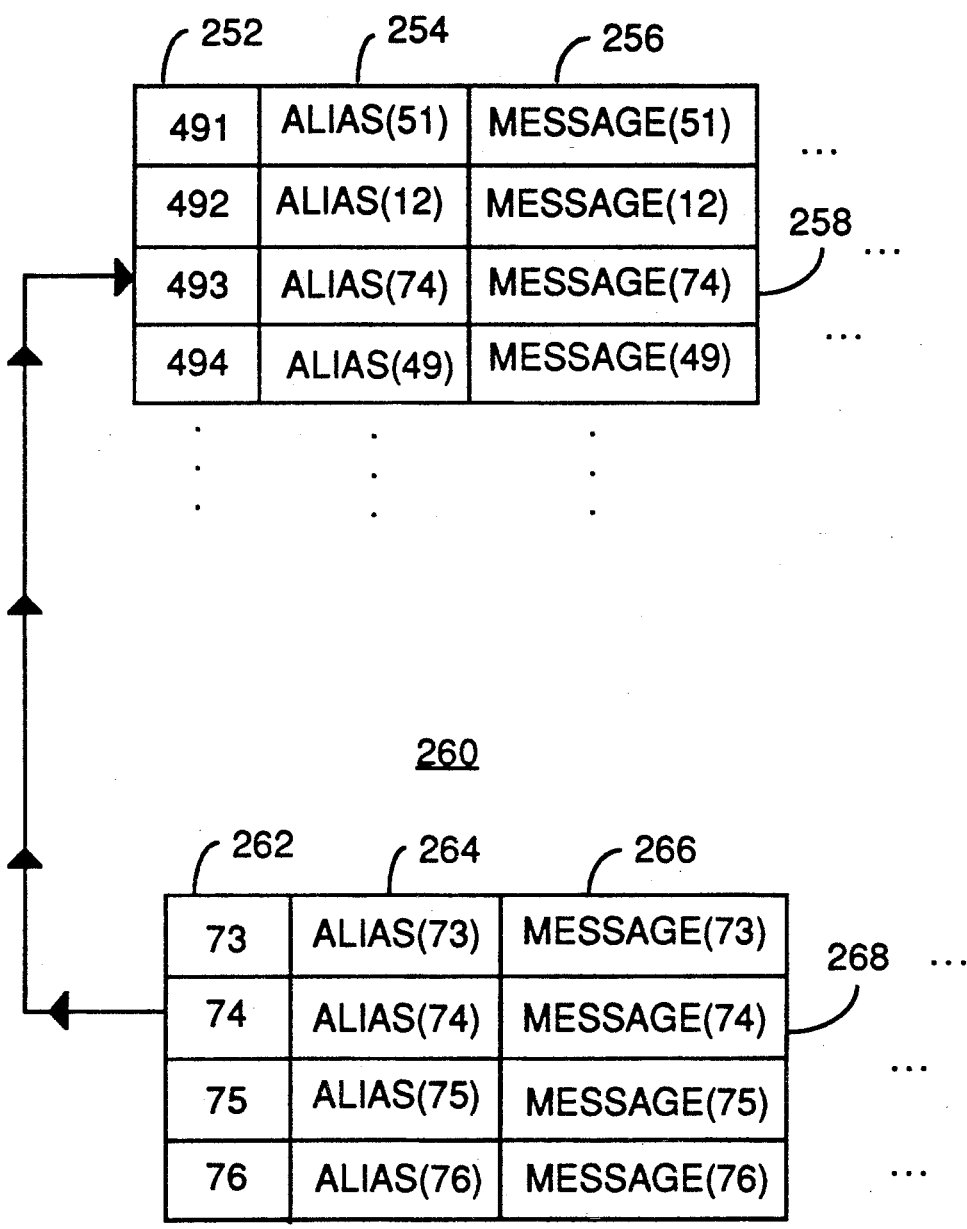
FIG. 2B is a block diagram representing two records in the database, in accordance with the present invention.
Figures 3A, 3B:
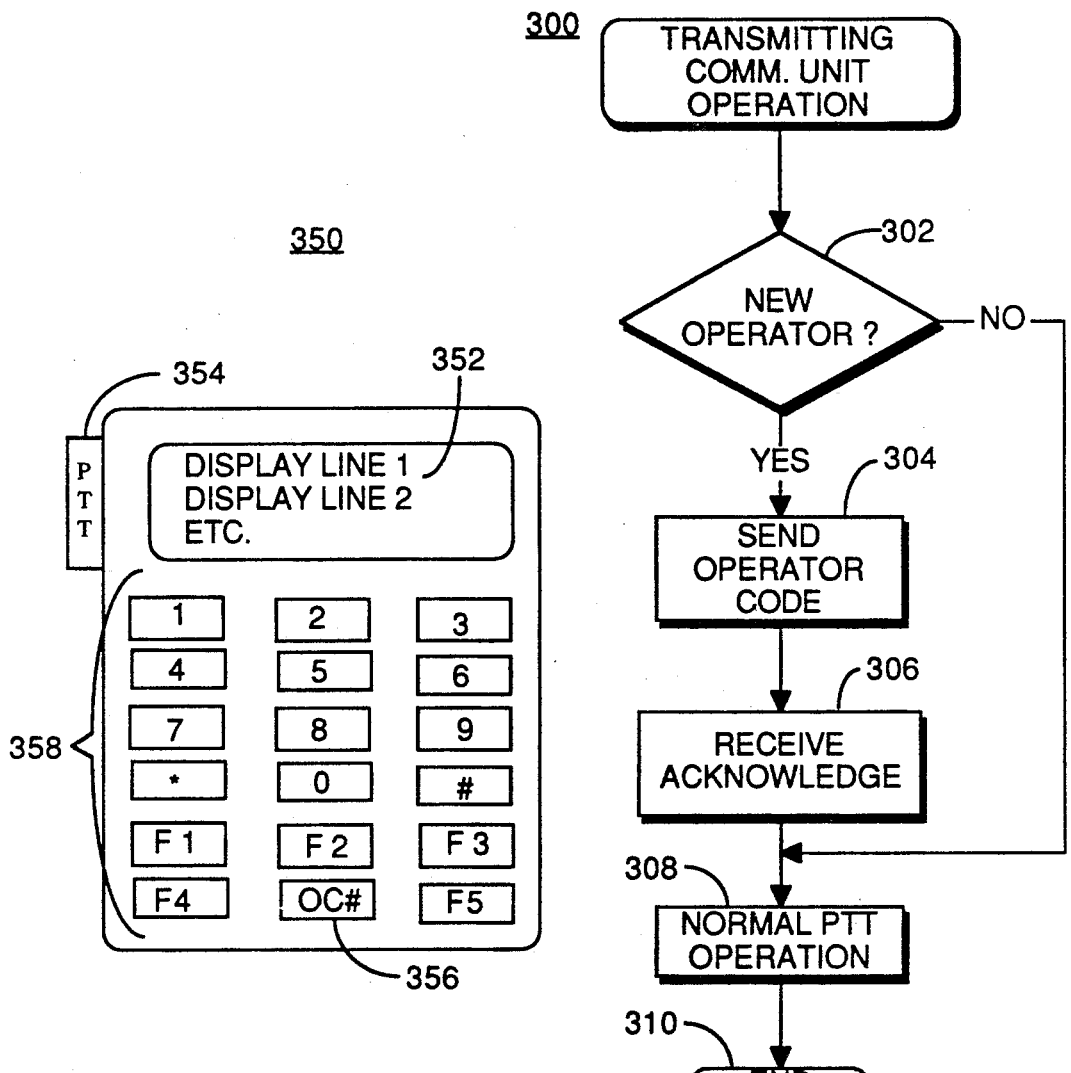
FIG. 3A is a flow diagram detailing the operation of a transmitting communication unit performing the task of sending an operator code, in accordance with the present invention.
FIG. 3B is a simplified block diagram of a communication unit, in accordance with the present invention.

Turning now to FIG. 2B, there are shown two records 250, 260 of a database as they might appear in the preferred embodiment of the present invention. Record 260 shows 'alias' and 'message' information for each of the operators which may potentially use communication units 213, 215 on the system 200. In the scope of the present invention, an 'alias' refers to a unique name associated with a communication unit operator, while a 'message' refers to any other operator-specific text which an operator may want disseminated, for example a special status or some other significant information. Referring first to record 260, the fields 264 and 266 represent the alias and message, respectively, for the operator whose code is shown in the accompanying field 262. Record 250 shows the current alias and message assignments for each communication unit which is active on the system. The field 252 represents the communication unit identification, or fixed ID, for every communication unit currently active on the system. The records 254 and 256 represent the alias and message, respectively, for the operator who is currently using the associated communication unit. Record 250, unlike record 260, is dynamically altered each time a different operator begins to use a particular communication unit. Turning to FIG. 3A, it can be shown how this altering takes place in real time within the system. Flow diagram 300 shows the operation of the data processing unit 219 in a transmitting communication unit acting on the system. The routine begins with a decision at 302 which determines whether or not the operator using a particular communication unit is a new operator. This may be the case at the beginning of a work shift, or whenever one communication unit, or radio, changes hands between operators for any reason. Assuming that not to be the case; that is, the current operator has already transmitted at least once on a particular radio, the radio undergoes normal push-to-talk operation at 308 and the routine is exited at 310. To better describe the mode of "normal operation", FIG. 3B shows a block diagram of a typical communication unit 350 which embodies the present invention. This communication unit includes the typical push-to-talk (PTT) button 354, a numeric keypad, and function keys in area 358. The 'OC#' button 356, is used as a prefix to the operator code number in the scope of the present invention. Turning back to FIG. 3A, if at decision 302 the conditions are such that the operator is new, the operator sends its own operator code at 304 using, for example, the 'OC#' button 356, followed by a predetermined number sequence which matches their operator code. Then, upon receipt of an acknowledge signal at 306 from the resource controller 203, the communication unit undergoes normal push-to-talk operation at 308 and the routine is exited at 310.

Figure 3C:
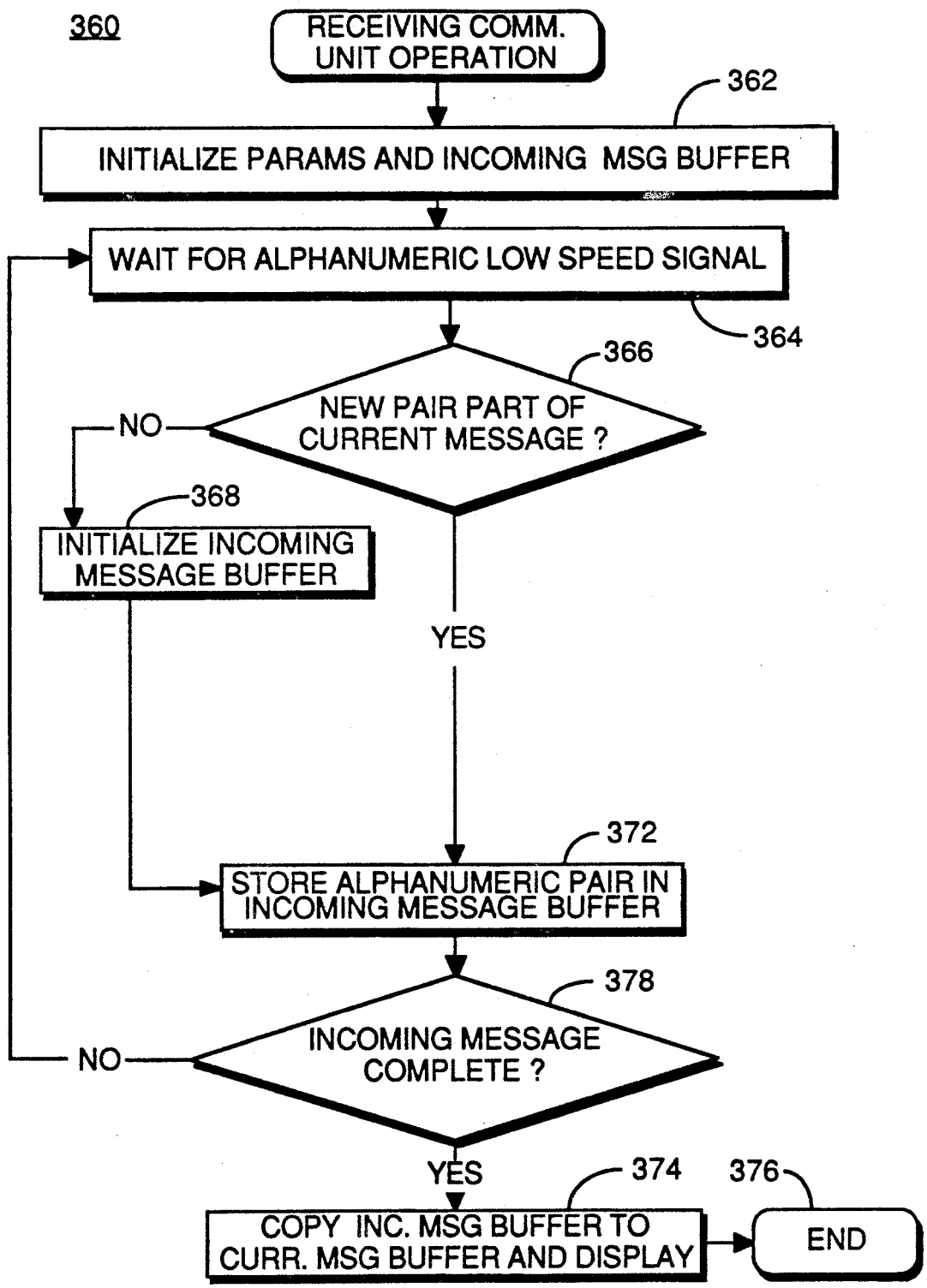
FIG. 3C is a flow diagram detailing the operation of a receiving communication unit performing the task of decoding a user message, in accordance with the present invention.

FIG. 3C shows a flow diagram 360 which details the operation of the data processing unit 219 in a receiving communication unit 350. The routine begins when an incoming voice channel signal indicates that a message is being received, for example, when the message delimiter bit 108 has toggled from the previous received word. At this time, all operational parameters and the incoming message buffer are initialized at 362 and the communication unit waits for sub-audible (low speed) alphanumeric pairs at 364. The routine then reaches a decision at 366, which determines whether or not the new pair received is part of the current message. If the new pair is part of the current message, the communication unit stores the alphanumeric pair in the incoming message buffer at 372 in the location corresponding to the 'CSQ', field 104 of word 100, value. If the new pair is not part of the current message, the communication unit initializes at 368 the incoming message buffer and stores the alphanumeric pair in the incoming message buffer at 372. A decision is then reached at 378, where it is determined whether or not the stored pair completes the message that was sent. If the message is not complete, as determined by the 'EOS' bit 106 value and the 'CSQ' field 104 value, both of word 100, the communication unit again waits at 364 for incoming alphanumeric pairs. If the message is found to be complete, the communication unit copies the 'incoming message buffer' to the 'current message buffer' and displays it at 374 to be read by the receiving operator. This display may be like that shown in FIG. 3B as display window 352, or any number of other suitable means. In a second embodiment the alphanumeric pairs may be displayed on display window 352 as they are received; not necessarily waiting until the message is complete. The routine is then exited at 376.

Figure 4:
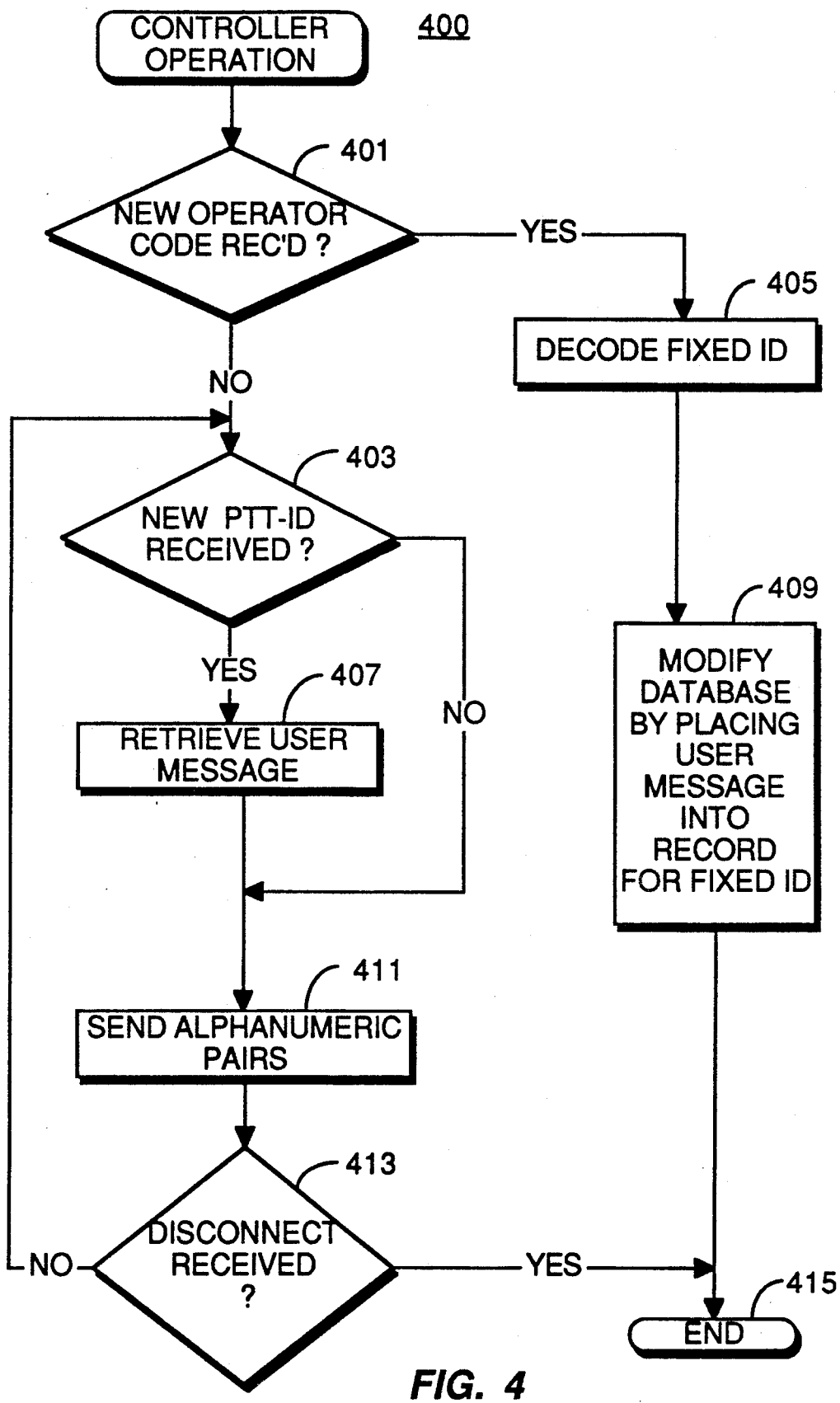
FIG. 4 is a flow diagram detailing the operation of the resource controller performing the tasks of modifying the database and generating a user message to be sent to receiving communication units, in accordance with the present invention.

FIG. 4 shows the operation of the data processing unit 217 within the resource controller 203 in accordance with the present invention. Routine 400 begins with a decision at 401, which determines whether or not a new operator code has been received by the resource controller. If the code received is a new operator code, the resource controller then decodes at 405 a fixed ID of the communication unit. The resource controller then modifies at 409 that portion of record 250 associated with that communication unit, by writing the appropriate user alias and message into fields 254 and 256, respectively. To illustrate this modification process, refer again to FIG. 2B. Assume an operator having a code of '74' begins to use communication unit with a fixed ID '493'. Before transmitting on this communication unit, an operator keys in their operator code number, which is then detected at 401. The resource controller then decodes at 405 the fixed ID which comes as part of the first transmission of communication unit 493. Having done this, the resource controller then modifies at 409 the database 201, reflecting the fact that operator 74's alias and message, respectively, are now associated with communication unit 493. This is shown in FIG. 2B as the information block 268 is copied to record 250 and is represented there as information block 258. After this write process has taken place, the routine 400 is exited at 415. Moving back up to decision 401, if a new operator code is not received, a decision at 403 is reached which determines whether or not the received and decoded fixed ID, for example a radio's PTT ID, is new. If the ID is new, the resource controller retrieves the associated operator message from record 250 at 407 then sends at 411 the message, in alphanumeric pairs, to all receiving radios. If the ID received is not new, then the resource controller bypasses the retrieve process at 407 and simply sends at 411 the last retrieved message, in alphanumeric pairs, to all receiving radios. In the preferred embodiment of the present invention, this 'messaging' is accomplished using sub-audible signals sent over the assigned communication resource for that communication. A decision is then reached at 413 which determines whether or not a disconnect has been received by the resource controller. If no disconnect has been received, the routine returns to decision 403 which determines whether or not a new PTT ID has been received. If a disconnect has been received the routine is exited at 415.

What is claimed is:

1. A method of operator messaging within a radio communication system having a resource controller capable of allocating, via a control resource, a plurality of communication resources among a plurality of communication units, each communication unit being operated by an operator having an operator code that is uniquely associated with an operator message, which operator code and operator message, along with identification codes representing each of the plurality of communication units, are stored in a database coupled to the resources controller, the method comprising the steps of, for each of a plurality of communication units participating in a communication:

during at least a first transmission from a transmitting one of the plurality of participating communication units as used by a particular operator, transmitting an identification associated with said transmitting communication unit and an operator code associated with the particular operator;

granting, to said transmitting communication unit, access to one of the communication resources;

matching at least said transmitted identification with one of the stored identification codes in the database;

retrieving, responsive to said step of matching, a first operator message from the database associated with the particular operator of said transmitting communication unit;

sending, via sub-audible signals on said granted communication resource, said first operator message to at least a receiving one of the plurality of participating communication units; and displaying said first operator message on a receiving one of the plurality of participating communication units.

2. A method of operator messaging in accordance with claim 1, wherein said first operator message comprises an alias of said particular operator.

3. A method of operator messaging in accordance with claim 1, further comprising the step of, during a second transmission by the particular operator, transmitting only the identification associated with said transmitting communication unit.

4. A method of operator messaging in accordance with claim 1, further comprising the steps of:

sending a second operator code associated with a second operator from said transmitting communication unit; and modifying the database to reflect an association between a second message uniquely associated with said second operator and the identification code of said transmitting communication unit.

5. A method of operator messaging in accordance with claim 3, further comprising the step of retrieving, in response to the second transmission, a previously stored operator message that is uniquely associated with the operator code transmitted during the first transmission.

6. A method of operator messaging in accordance with claim 4, wherein said step of modifying comprises the step of storing said second message in a field of the database corresponding with a field of the database bearing the identification code of the transmitting communication unit.

7. A method of operator messaging within a radio communication unit accessing, upon being granted permission by a resource controller, one of a plurality of communication resources, the communication unit being capable of operating in a transmitting mode and in a receiving mode, by an operator having a unique operator code that is uniquely associated with a message, which operator code and message, along with identification codes representing each of the plurality of communication resources, are stored in a database coupled to the resource controller, the method comprising the steps of:

while operating in the receiving mode:

gaining access to a communication resource in order to receive a voice transmission originating from a communication unit being operated by a first operator in the transmitting mode;

receiving, via sub-audible signals on said communication resource, at least part of an operator message uniquely associated with the first operator; and displaying said at least part of the operator message during said voice transmission.

8. A method of operator messaging in accordance with claim 7, further comprising the step of, while operating in the transmitting mode, sending a second operator code associated with a second operator.

9. A method of operator messaging within a radio communication resource controller, the resource controller being able to allocate, via a control resource, a plurality of communication resources among a plurality of communication units, each communication unit being operated by an operator having an operator code that is uniquely associated with an operator message, which operator code and message, along with identification codes representing each of the plurality of communication units, are stored in a database coupled to the resource controller, the method comprising the steps of, during at least a first voice transmission from a transmitting communication unit:

receiving an identification associated with the transmitting communication unit and an operator code associated with a first operator of the transmitting communication unit;

matching at least said received identification with one of the stored identification codes in the database;

retrieving, responsive to said step of matching, a first operator message from the database uniquely associated with the first operator; and sending, via sub-audible signals on a granted communication resource, said first operator message to at least a receiving one of the plurality of communication units.

10. A method of operator messaging in accordance with claim 9, further comprising the steps of receiving a second operator code associated with a second operator from said transmitting communication unit; and modifying the database to reflect an association between a second message associated with said second operator and the identification code of said transmitting communication unit.

11. A radio communication resource controller, which is able to allocate, via a control resource, a plurality of communication resources among a plurality of communication units, each communication unit being operated by an operator having an operator code that is uniquely associated with an operator message, which operator code and message, along with identification codes representing each of the plurality of communication units, are stored in a database coupled to the resource controller, the resource controller comprising:

means for receiving during at least a first transmission period, from each of a plurality of communication units participating in a communication, an operator code uniquely associated with a first operator, and an identification from a transmitting one of the plurality of participating communication units requesting access to one of the plurality of communication resources;

means for matching at least said received identification with one of the stored identification codes in the database;

means for retrieving, coupled to said means for matching, a previously stored operator message from the database uniquely associated with the first operator of said transmitting communication unit; and means for sending, via sub-audible signals on said requested communication resource, said previously stored operator message to at least a receiving one of the plurality of participating communication units.

12. A radio communication resource controller in accordance with claim 11, further comprising:

means for receiving a second operator code associated with a second operator from said transmitting communication unit; and means for modifying the database to reflect an association between a second message associated with said second operator and the identification code of said transmitting communication unit.

13. A radio communication resource controller according to claim 11, further comprising:

means for establishing a link between the stored identification code corresponding to the identification of a communication unit and the operator message uniquely associated with a current operator of the communication unit.

14. A radio communication resource controller according to claim 13, further comprising:

means for determining whether a newly received operator code corresponds to the operator code currently linked with the identification code for the transmitting communication unit.

15. A radio communication resource controller according to claim 14, further comprising:

means for modifying the database when it is determined that the received operator code does not correspond to the operator code currently linked with the identification code for the transmitting communication unit, such that subsequent transmissions from the transmitting communicating unit results in sending of the operator message uniquely associated with the newly received operator code.

* * * * *